AMPLIFIER USING CONDENSER WITH VOLTAGE-RESPONSIVE DIELECTRIC

Filed May 3, 1947

G. HEPP
INVENTOR
BY Fred M. Vogel
AGENT

Patented Nov. 4, 1952 2,616,989

UNITED STATES PATENT OFFICE 2,616,989

AMPLIFIER USING CONDENSER WITH VOLTAGE-RESPONSIVE DIELECTRIC

Gerard Hepp, Eindhoven, Netherlands, assignor to Hartford National Bank and Trust Company, Hartford, Conn., as trustee Application May 3, 1947, Serial No. 745,876
In the Netherlands March 27, 1946

Section 1, Public Law 690, August 8, 1946
Patent expires March 27, 1966

2 Claims. (Cl. 179—171)

Figures 1, 2:
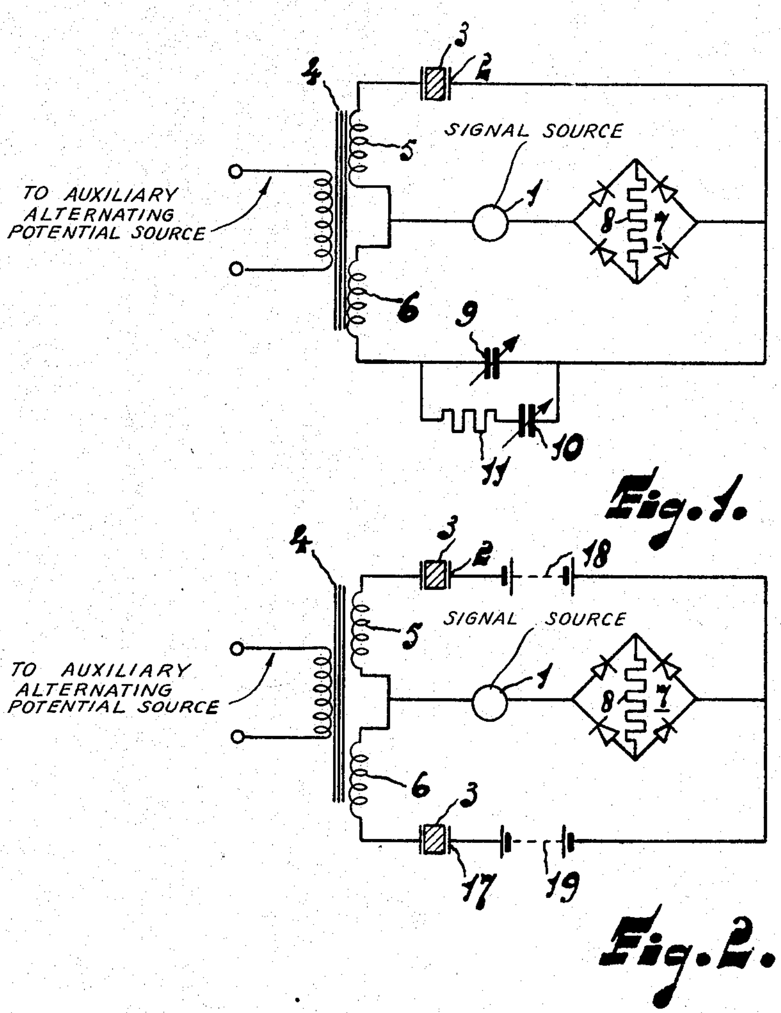

The invention relates to a circuit-arrangement, in which use is made of the non-linear, electrical phenomena which are produced in an electric circuit or in which the amplitude, the phase or the frequency of an electrical oscillation generated in an electric circuit is controlled, a condenser being used which comprises a dielectric, the properties of which depend on the voltage across the condenser and/or on the current which is passed through the condenser.

As examples of circuit-arrangements in which use is made of the non-linear, electrical phenomena which are produced in an electric circuit may be mentioned circuit-arrangements for amplitude-, phase- or frequency-modulation (the term modulation to be understood here and hereinafter, to including mixing), for demodulation, frequency-multiplying and frequency-dividing. As examples of circuit-arrangements in which the amplitude, the phase or the frequency of an electrical oscillation is controlled by a control-voltage may be mentioned circuit-arrangements for acting upon the tuning of an oscillatory circuit and circuit-arrangements for obtaining note correction, contrast expansion, automatic frequency correction and automatic gain control in radio receivers.

The invention is particularly important for amplifying an electrical signal by modulation with the use of an auxiliary oscillation and subsequent demodulation.

In various of the above-mentioned circuit-arrangements use is already made of blocking layer rectifiers to constitute the modulators. According to the invention, the said dielectric is made of substances which primarily comprise representatives of the ternary system $$BaTiO_3—SrTiO_3—PbTiO_3$$

or $KH_2PO_4$ and several compounds isomorphous therewith. When using the first-mentioned substances, it is not necessary for all three of the constituents of the ternary system to be provided at the same time.

Particularly satisfactory results are obtained with dielectrics which primarily comprise $BaTiO_3$ or representatives of the binary system $$BaTiO_3—SrTiO_3,$$

for example, $BaTiO_3$ associated with at most 35 mol per cent of $SrTiO_3$.

The various binary and ternary mixed products of the system $BaTiO_3—SrTiO_3—PbTiO_3$ form homogeneous mixed crystals which, similar to the constituent elementary bodies, exhibit a perovskite structure.

The dielectrics may contain from 30 to 40% of substances which are not among the said chemical compounds; the dielectric may comprise not more than 10%, but as a rule not more than 5% of non-homogeneous admixtures i. e. admixtures which are not included in the mixed crystal.

The dielectrics produce the best results, if they are used at the temperature at which their dielectric constant has a maximum value (generally, this temperature diverges but little from the Curie-temperature of the dielectric). They are preferably used at a temperature which is slightly below this temperature. If the difference is small, the dielectric tends to be heated during use to the temperature at which the dielectric constant has reached its maximum value and to be stabilized substantially at this temperature.

The temperature range, within which the above-mentioned substances exhibit their non-linear, dielectric properties, more particularly the temperature at which the dielectric constant has a maximum value, may be varied, by the choice of proper mixing ratios, between temperatures of more than a hundred degrees below and temperatures exceeding room temperature by several hundred degrees.

Thus, for example, the temperature of the system $BaTiO_3—SrTiO_3$, at which the electric constant $\epsilon$ has a maximum value, is for different percentages of $SrTiO_3$ approximately at the following values:

| Vol. Percent $SrTiO_3$ | temperature for $\epsilon_{max.}$ °C. |
|---|---|
| 0 | 120 |
| 15 | 70 |
| 20 | 50 |
| 30 | 20 |
| 35 | 0 |

For use (at room temperature) it is advisable to choose the percentage of $SrTiO_3$ between 15 and 30.

The possibility of using $KH_2PO_4$ and the substances isomorphous therewith as a dielectric for the present purpose, is comparatively restricted, since the temperature range within which these substances exhibit their non-linear, dielectric properties is far below room temperature.

Dielectrics according to the invention exhibit a considerably greater non-linear action (materially greater voltage or current dependence of the dielectric properties) and smaller losses than the blocking layer rectifiers which are known for this purpose, so that the circuit-arrangements to which the invention is applied produce a materially better result than prior circuit-arrangements. It is not necessary for all of the properties of the dielectric to be voltage and/or current dependent; as a rule the dielectric constant exhibits this dependency, the loss angle exhibits it frequently, and sometimes both of them exhibit it.

In order that the invention may be more clearly understood and readily carried into effect, it will now be explained more fully with reference to the accompanying drawing, in which two embodiments are shown, by way of example, both of which apply to a circuit-arrangement for amplifying an electrical signal in which the invention is employed.

Referring to Fig. 1, 1 designates the source which supplies the signal required to be amplified, for example a low-frequency signal or a direct current voltage. In order to obtain a high gain, it is desirable, as a rule, that the signal should have the nature of a direct current voltage. It may, for example, be formed by superposition of an alternating voltage and a unidirectional voltage such that the combined signal always has the same polarity.

The circuit which includes the source comprises in addition a condenser 2 having a dielectric 3, one of the secondary windings 5 of a transformer 4 and also a bridge circuit 7 comprising four rectifiers and a resistance 8. The bridge circuit 7 is known in practice under the name of Grätz arrangement.

The primary of transformer 4 is supplied with an alternating voltage and the above mentioned circuit of the condenser 2 has consequently induced in it, via the secondary winding 5, an alternating voltage which is active therein as an auxiliary oscillation.

The dielectric 3 is constituted by a substance, the properties of which depend on the voltage across the condenser 2; according to the invention this substance comprises mixed crystals of perovskite structure containing 80 mol. per cent of $BaTiO_3$ and 20 mol. per cent of $SrTiO_3$.

Owing to the non-linear properties of the condenser 2, the auxiliary oscillation, inter alia, is amplitude-modulated by the signal. The amplified signal is obtained from the modulated auxiliary oscillation, with the aid of the bridge circuit 7, by demodulation (in this case rectification). The said signal is set up across resistance 8.

It is not necessary for all of the signal source, the auxiliary oscillation source, the condenser and the demodulator to be included in series in the electric circuit. As an alternative, a number of these elements may be connected in parallel provided that undue short-circuiting of the oscillations active in the circuit is avoided.

In order to minimise the current of the frequency of the auxiliary oscillation which is passed through the bridge circuit 7, the circuit is arranged in push-pull and this is ensured by connecting, in parallel with the series combination of the secondary winding 5 and the condenser 2, a second series combination formed by another secondary winding 6 of transformer 4 and a variable condenser 9 having a voltage-independent dielectric, the dielectric being constituted, for example by air. Condenser 9 is adjusted in such manner that, in the absence of a signal, in practice current of the frequency of the auxiliary oscillation is not passed to any appreciable extent through this branch of the circuit-arrangement, which includes the bridge circuit 7. This adjustment may be improved, as shown in Figure 1, by connecting in parallel with condenser 9 a series combination of a variable condenser 10 and a resistance 11.

Suitable adjustment of condenser 10 and resistance 11 permits of the losses of condenser 2 being imitated, so as to enable substantially complete compensation of the current of the auxiliary oscillation to be obtained.

In a practical case, in which a direct current was amplified, the voltage of the source 1 was 250 vs., and the current strength supplied by this source was $10^{-8}$ amps. An alternating voltage of 250 volts 4000 c./s. was induced in each of the windings 5 and 6. The resistance 8 had a value of 10,000 ohms. A direct current of 0.5 ma. occurred across this resistance, which means that the circuit-arrangement produced a 50,000 fold current amplification and a 1000 fold amplification of the power.

It may, furthermore, be noted that the circuit-arrangement described is generally particularly suited for current and/or energy amplification.

Fig. 2 shows a circuit-arrangement which corresponds substantially entirely with that of Fig. 1. The difference resides in the manner in which compensation of the current of the auxiliary frequency is obtained in the branch of the bridge circuit, the variable condenser 9 and the series combination of the variable condenser 10 and the resistance 11 being replaced by a condenser 17 which comprises a dielectric of the same kind as the condenser 2.

Furthermore, condenser 2 has connected in series a unidirectional voltage source 18 and condenser 17 has connected in series a unidirectional voltage source 19. These two unidirectional voltage sources set up across the corresponding condensers bias voltages which exceed the signal voltage from source 1 and which moreover, are of opposite polarity for the condensers 2 and 17, with the result that the absolute value of the voltage in one branch of the circuit increases with an increasing value of the signal, whereas it decreases in the other branch. The circuit is adjusted so that, if the voltage of source 1 is equal to zero, the capacity values of the condensers 2 and 17 are equal. The circuit-arrangement exhibits the advantage that temperature variations do not affect compensation.

The circuit-arrangements as described are not only suitable for amplifying low-frequency signals and unidirectional voltages, but also for amplifying signals superposed on a carrier wave by modulation and may also be used for example in wireless receivers. In the case of amplification of low-frequency oscillations the frequency of the auxiliary oscillation is required to be higher than and, preferably, be high compared with the highest frequency which occurs in the oscillations required to be amplified.

As a rule it is desirable to apply a bias voltage to the condenser but sometimes the supply of a bias voltage is unnecessary or harmful. Thus for example in a circuit-arrangement for frequency multiplication, primarily the second (generally an even) harmonic of the fundamental oscillation is obtained, if a bias voltage is applied to the condenser. The third (in general an odd) harmonic, however, is primarily generated if no bias voltage is supplied to the condenser.

Alternatively, the condenser comprising the dielectric according to the invention may effectively be used as an impedance, the value of which is variable by means of a control-voltage. Circuit-arrangements, in which use is made of an impedance controlled by a control-voltage are well-known in the art and are, inter alia, used for controlling the tuning of the oscillatory circuit in general and for obtaining automatic volume control, note correction, frequency correction, and for generating contrast-expansion in radio receivers and also for remote control for instance of transmitters and receivers in particular.

Owing to the high degree of voltage or current depending respectively of the present dielectrics very effective control may be obtained.

If a circuit-arrangement comprises more than one condenser having a dielectric according to the invention, it is frequently desirable to arrange that the dielectrics of two or more of these condensers are constituted by a single integral unit, for example, by a plate or a tube. This has the advantage that discrepancies in the constitution of the dielectric, which may be a source of trouble particularly in push-pull arrangements, do not become manifest or are less prevalent. This permits in addition of realizing a very compact arrangement of the circuit.

What I claim is:

1. Apparatus for amplifying signals from a source having a given polarization comprising a voltage-responsive capacitive element having a given static magnitude and a dielectric selected from a group consisting of compounds of the ternary system of barium titanate, strontium-titanate and lead titanate and of primary potassium phosphate, a demodulator having an input circuit and an output circuit, a resistive-capacitive network having an impedance value equivalent to the static magnitude of said capacitive element, the capacitive section of said network being constituted by a voltage-independent dielectric, means to apply an auxiliary alternating potential in phase-opposition to said capacitive element and to said network, and means to apply the output of said signal source through the input circuit of said demodulator in cophasal relationship to said capacitive element and to said network, whereby an amplified signal is produced in said output circuit.

2. Apparatus for amplifying signals from a source having a given polarization comprising a voltage-responsive capacitive element having a given static magnitude and a dielectric selected from a group consisting of compounds of the ternary system of barium titanate, strontium-titanate and lead titanate and of primary potassium phosphate, a demodulator having an input circuit and an output circuit, a resistive-capacitive network having an impedance value equivalent to the static magnitude of said capacitive element, the capacitive section of said network being constituted by a voltage-independent dielectric, a transformer having a primary winding and a center-tapped secondary winding, an auxiliary alternating potential source connected to said primary winding, means connecting said element in series with said network across said secondary winding, and means connecting said signal source in series with the input circuit of said demodulator between the center-tap of said secondary winding and the junction of said element and said network, whereby an amplified signal is developed across said output circuit.

GERARD HEPP.

REFERENCES CITED

The following references are of record in the file of this patent:

UNITED STATES PATENTS

| Number | Name | Date |
|---|---|---|
| 2,191,315 | Guanella | Feb. 20, 1940 |
| 2,461,307 | Antalek | Feb. 8, 1949 |
| 2,473,556 | Wiley | June 21, 1949 |

OTHER REFERENCES

Proceedings U. S. Electro-Chemical Society, vol. 89, pp. 331–356, Eugene Wainer "High Titania Dielectrics."